US007878586B2

(12) United States Patent
Kneller et al.

(10) Patent No.: US 7,878,586 B2
(45) Date of Patent: Feb. 1, 2011

(54) SYSTEM AND METHOD FOR AN ANTICIPATORY PASSENGER CABIN

(75) Inventors: Heidi J. Kneller, Bellevue, WA (US); Calsee N. Robb, Seattle, WA (US); William A. Harkness, Everett, WA (US); Buddy L. Sharpe, Mill Creek, WA (US); James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 637 days.

(21) Appl. No.: 11/927,648

(22) Filed: Oct. 29, 2007

(65) Prior Publication Data
US 2009/0108649 A1 Apr. 30, 2009

(51) Int. Cl.
A47C 7/00 (2006.01)
B64C 7/00 (2006.01)
(52) U.S. Cl. ............... 297/217.6; 244/129.1; 297/217.1; 297/217.3; 297/217.7
(58) Field of Classification Search ................... 297/66, 297/112, 118.6, 184.14, 188.01, 284.11, 297/316, 354.13
See application file for complete search history.

(56) References Cited
U.S. PATENT DOCUMENTS

| 6,682,494 | B1 * | 1/2004 | Sleichter et al. ............... 601/57 |
| 2001/0003806 | A1 * | 6/2001 | Swan et al. .................... 701/49 |
| 2001/0020202 | A1 * | 9/2001 | Obradovich et al. ........... 701/1 |
| 2004/0066067 | A1 * | 4/2004 | Wagner et al. ......... 297/216.15 |
| 2005/0080533 | A1 * | 4/2005 | Basir et al. .................... 701/45 |
| 2006/0075344 | A1 * | 4/2006 | Jung et al. ................... 715/705 |

OTHER PUBLICATIONS http://www.engadget.com/2007/07/06/researchers-devise-thermally-activated-flexible-display/, printed Oct. 19, 2007, 7 Pages.
http://technology.newscientist.com/article.ns?id=dn12198&print=true, "New Display Turns Up the Heat on LCDs," printed Oct. 19, 2007, 2 Pages.

* cited by examiner

Primary Examiner—Khoi Tran
Assistant Examiner—Rodney King
(74) Attorney, Agent, or Firm—Harness, Dickey & Pierce, P.L.C.

(57) ABSTRACT

A system for anticipating the needs of at least one passenger onboard a mobile platform (such as a train, marine vessel, aircraft or automobile) is provided. The system includes a passenger seating area for receipt of the passenger. The passenger seating area includes a seat that has a seat back that moves into a reclined position, a tray table that is operable to be positioned to provide a surface for use by the at least one passenger, and a light source disposed for illumination of at least a portion of the passenger seating area. The system includes a camera that acquires an image of the passenger, and a gesture control module that generates activity data that includes at least one activity that the passenger is performing as recognized in the image of the at least one passenger acquired by the camera. The system further includes a smart control module that moves the seat back, positions the tray table, activates or deactivates the light source and performs combinations thereof based on the activity data.

22 Claims, 8 Drawing Sheets

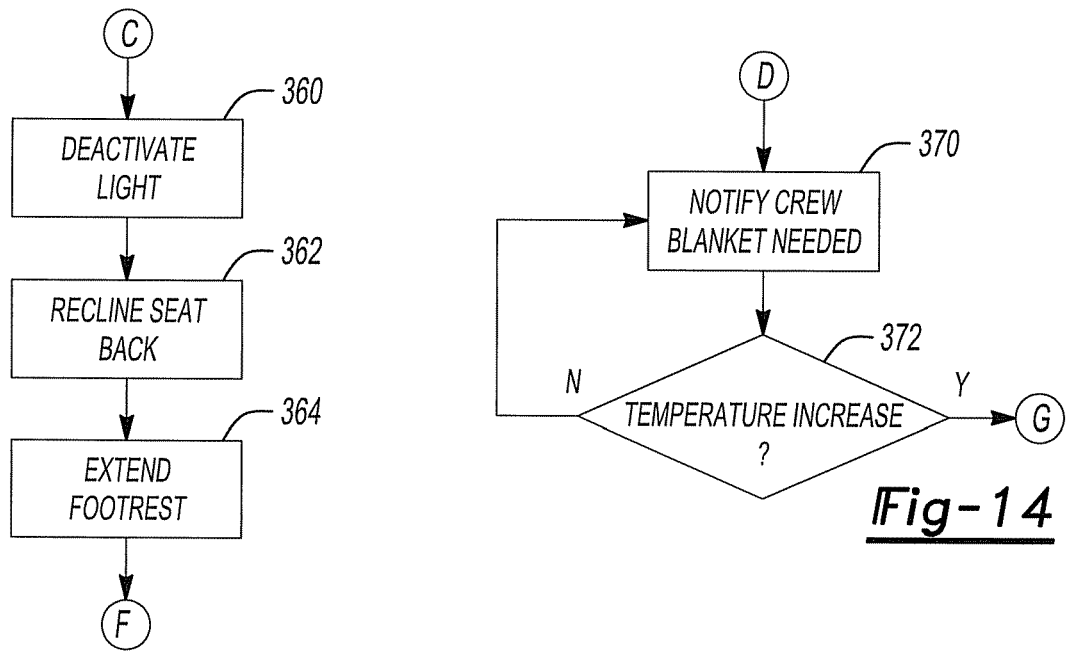
Fig-13
Fig-14
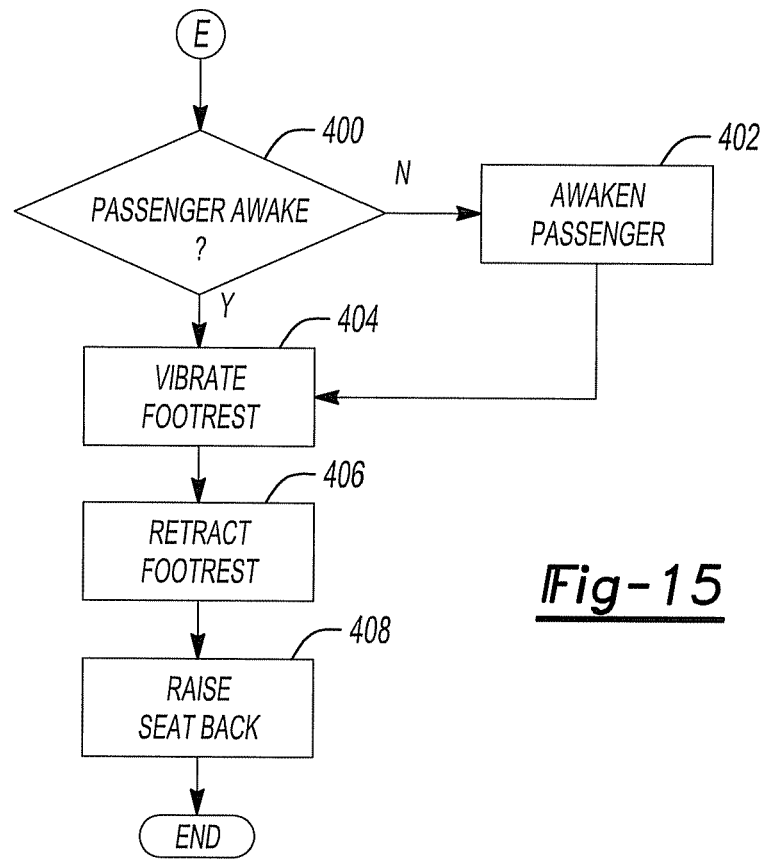
Fig-15

SYSTEM AND METHOD FOR AN ANTICIPATORY PASSENGER CABIN

FIELD

The present disclosure relates generally to mobile platforms that have passenger cabins, and more particularly to a system and method for an anticipatory passenger cabin.

BACKGROUND

The statements in this section merely provide background information related to the present disclosure and may not constitute prior art.

Many commercial mobile platforms (such as trains, ships, aircraft and automobiles) have areas of passenger seating. For example, in the case of a commercial aircraft, a fuselage of the commercial aircraft may include a passenger cabin. The passenger cabin includes a plurality of passenger seating surfaces, which generally comprise seats with seat backs. The seat backs may be reclined to enable the passenger to relax during the flight of the aircraft. Near each seating surface is typically a tray table, a reading light, and a footrest.

Currently, in order for the passenger to recline his/her seat, the passenger generally must manually actuate a recline mechanism. In addition, in order to access the tray table, the passenger generally must unlock the tray table from the seat back, and then pull and adjust the tray table to a desired height. Further, the passenger typically must reach upward to manually turn the reading light on and off, which may be difficult for some passengers.

SUMMARY

A system for anticipating the needs of at least one passenger onboard a mobile platform is provided. The system includes a passenger seating area for receipt of the passenger. The passenger seating area includes a seat that has a seat back that moves into a reclined position, a tray table that is operable to be positioned to provide a surface for use by the at least one passenger, and a light source disposed for illumination of at least a portion of the passenger seating area. The system includes a camera that acquires an image of the passenger, and a gesture control module that generates activity data that includes at least one activity that the passenger is performing as recognized in the image of the at least one passenger acquired by the camera. The system further includes a smart control module that moves the seat back, positions the tray table, activates or deactivates the light source and performs combinations thereof based on the activity data.

In one implementation, a method of anticipating the needs of at least one passenger onboard a mobile platform is provided. The method includes providing a passenger seating area for receipt of the at least one passenger. The passenger seating area includes a passenger seat that has a light source disposed for illumination of at least a portion of the passenger seating area. The method also includes acquiring an image of the at least one passenger in the passenger seating area. The method further includes determining from the acquired image if the at least one passenger is at least reading or resting, activating the light source if the passenger is reading, and de-activating the light source if the passenger is resting.

The present teachings also provide an aircraft. The aircraft includes a fuselage that includes at least one passenger seating area for receipt of at least one passenger. The at least one passenger seating area includes a seat back that is movable into a reclined position. The movement of the seat back is controlled by a smart cabin control system that includes a camera that acquires an image of the at least one passenger in the passenger seating area. The smart cabin control system further includes a smart cabin control module that moves the seat back into the reclined position if, based on the acquired image, the passenger is resting.

Provided is a system for anticipating the needs of at least one passenger onboard an aircraft that includes a passenger seating area for receipt of the at least one passenger. The system includes a source of user preference data and user identification data, and a passenger seat that has a seat back that is moveable into a reclined position. The system also includes a tray table that is operable to be positioned to provide a surface for use by the at least one passenger, and a light source disposed for illumination of at least a portion of the passenger seating area. The system comprises a camera that acquires an image of the at least one passenger in the passenger seating area. The system also comprises a gesture control module that generates current activity data that includes at least one current activity that the at least one passenger is performing as recognized in the image of the at least one passenger acquired by the camera. The system further comprises a user profile control module that generates user profile data based on the user identification data. The user profile data includes at least a chronological history of activities performed by the user. The system also includes a user control module that generates expected activity data based on the current activity data and the user profile data. The expected activity data comprises at least one next activity that the system expects the passenger to perform based on the user profile data, chronological history and the current activity data. The system includes a smart control module that moves the seat back, positions the tray table, activates or deactivates the light source and performs combinations thereof based on the expected activity data and the user profile data.

Further provided is a method of anticipating the needs of at least one passenger onboard an aircraft. The method includes providing a passenger seating area for receipt of the at least one passenger. The passenger seating area includes a passenger seat that has a light source disposed for illumination of at least a portion of the passenger seating area, a seat back that is moveable into a reclined position, a footrest adjacent to the passenger seating area and a tray table that is positionable to provide a surface for use by the at least one passenger. The method also includes providing a vibration device coupled to at least one of the passenger seat and a footrest adjacent to the passenger seat. The method includes receiving a user input regarding a status of the aircraft, and acquiring an image of the at least one passenger in the passenger seating area. The method comprises determining from the acquired image if the at least one passenger is at least resting, and notifying the at least one passenger by activating the vibration device if the aircraft is nearing the end of travel based on the status of the aircraft provided in the user input and the user profile data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 13 is a dataflow diagram illustrating an exemplary an exemplary cabin control module of FIG. 4;

FIG. 14 is a dataflow diagram illustrating an exemplary an physiological control module of FIG. 4; and FIG. 15 is a flowchart illustrating an operational sequence for the smart cabin control system of FIG. 4.

DETAILED DESCRIPTION

The following description is merely exemplary in nature and is not intended to limit the present disclosure, application, or uses. Although the following description is related generally to a system and method for an anticipatory passenger cabin onboard a mobile platform (such as an aircraft, ship, spacecraft, train or land-based motor vehicle), it will be understood that the system and method for the anticipatory passenger cabin, as described and claimed herein, can be used with any appropriate application where it would be desirable for the surroundings of an individual to anticipate the needs of the individual, such as in a public bathroom. Therefore, it will be understood that the following discussion is not intended to limit the scope of the appended claims to only mobile platforms and mobile platform based systems. As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality.

Figure 1:
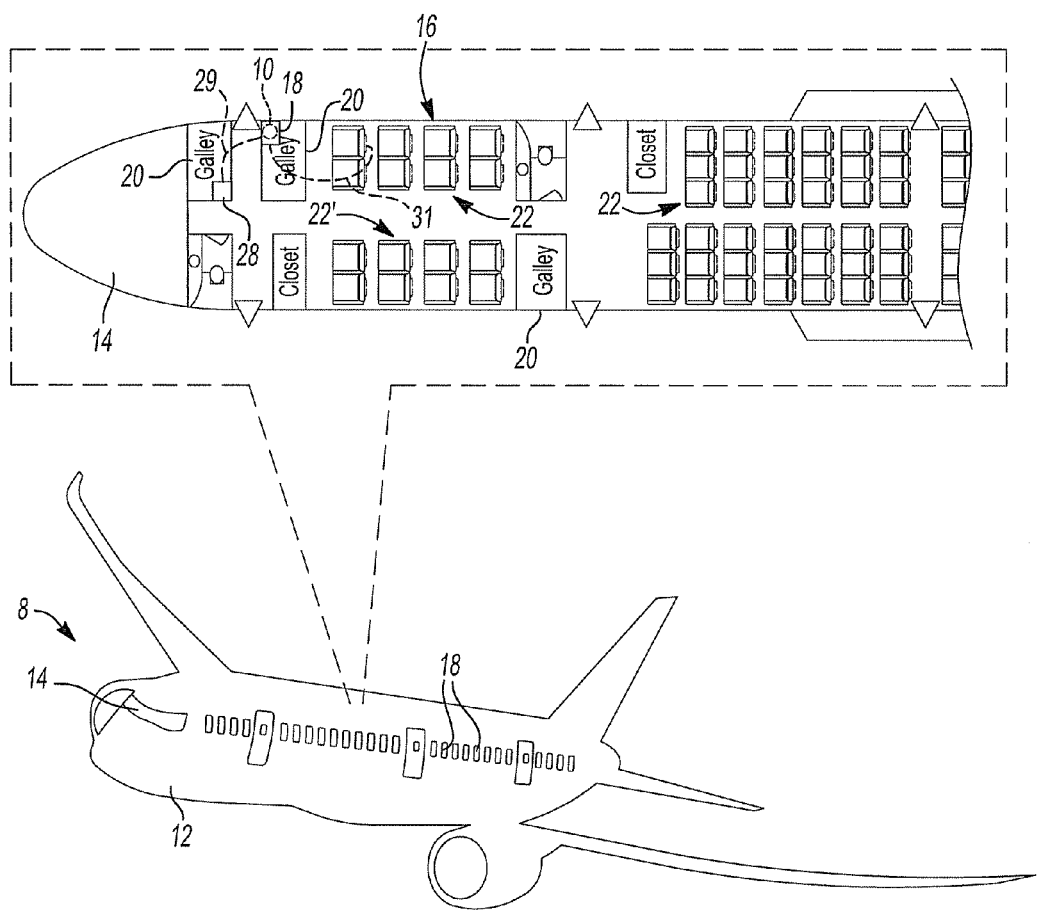
FIG. 1 is a schematic illustration of a mobile platform incorporating the system and method for a smart passenger cabin according to the principles of the present disclosure.
Figure 2:
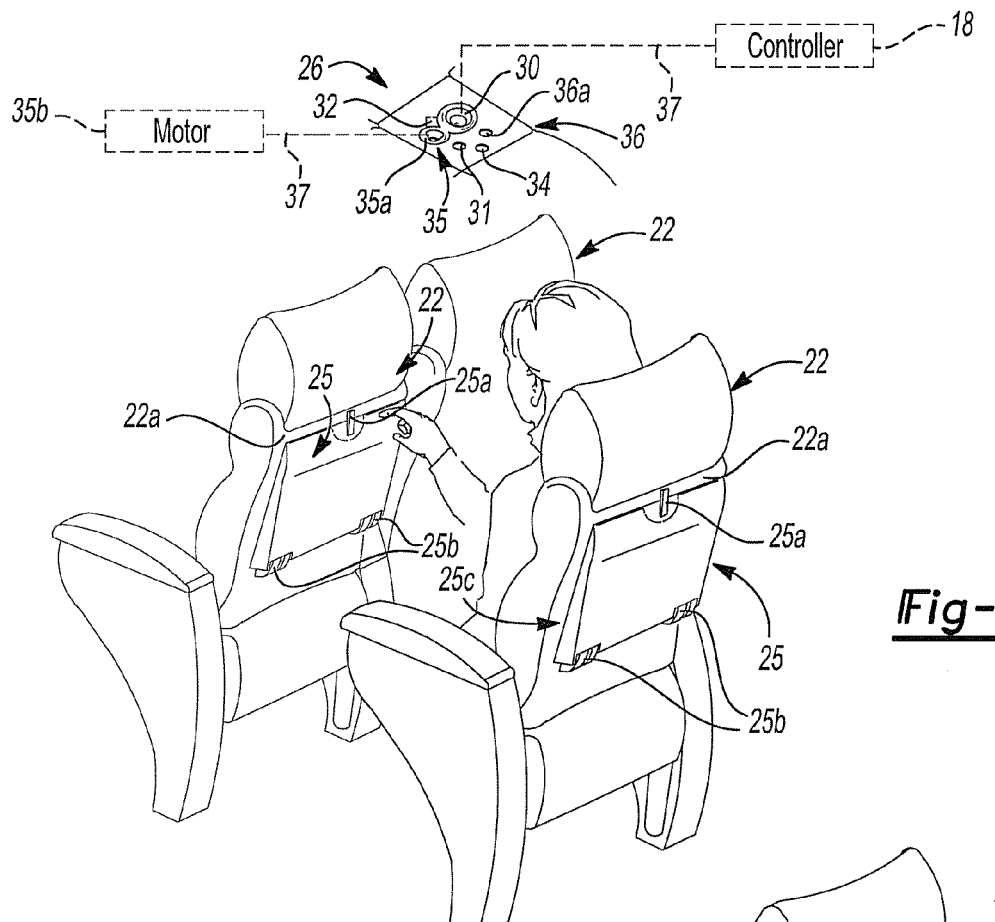
FIG. 2 is a schematic illustration of a passenger seated in the smart passenger cabin of FIG. 1 that includes an passenger service unit.

With reference to FIGS. 1 and 2, a schematic illustrates an exemplary mobile platform that employs a system and a method for an anticipatory or smart passenger cabin through a smart cabin control module 10. The mobile platform, in this example, is a passenger aircraft 8 that has a fuselage 12, which includes a cockpit 14, a cabin 16 and a controller 18. The cabin 16 includes at least one crew area 20, such as a galley, at least one passenger seat 22 and a passenger service unit 26 (FIG. 2).

With reference to FIGS. 1 and 2, the smart cabin control module 10 for the aircraft 8 is illustrated in accordance with the teachings of the present disclosure. The smart cabin control module 10 anticipates the needs of the passengers onboard the aircraft 8 to provide an enhanced passenger experience. In this regard, the smart cabin control module 10 operates to control the operation of various systems onboard the aircraft 8 such that when an anticipated activity of the passenger is recognized, the systems respond to the passenger's needs without requiring input from the passenger. The smart cabin control module 10 utilizes anticipatory logic to anticipate the needs of a passenger based on input information received from a user profile and current information from an array of sensor that describe a current activity of the passenger. The user profile tracks passenger habits and routines and stores them in the profile data. The user profile continues to be refined as the passenger uses the smart cabin control module 10. During the use of the smart cabin control module 10 the monitoring of physiological signs of the passenger become embedded into the profile to increase the accuracy of prediction. The smart cabin control module 10 may then use the history embedded into the profile to extrapolate an expected future need. The passenger may also enter data to create, update, or increase the accuracy of the prediction made by the smart cabin control module 10. Thus, the smart cabin control module 10 may serve to improve the overall passenger experience by providing the passengers with a cabin that determines the activity the passenger is about to perform, and reacts to the anticipated needs of the passengers, without necessarily requiring input from the passengers.

With reference to FIG. 1, the crew area 20 may include a control panel 28 in communication with and responsive to the controller 18. The control panel 28 may enable the crew to interface with the smart cabin control module 10. Thus, the control panel 28 may include at least one user input device and display means, such as a graphical user interface (GUI) for example, however, any suitable user input device and display means could be employed, such as button(s), a touch screen, a mouse, a stylus and/or a display screen. The passenger seat 22 may comprise any suitable passenger seating surface, for example, the passenger seat 22 could comprise the passenger seat described in commonly assigned U.S. Pat. No. 6,805,322 entitled "Multiple-Position Seat," issued on Oct. 19, 2004 and incorporated by reference herein.

Figure 3:
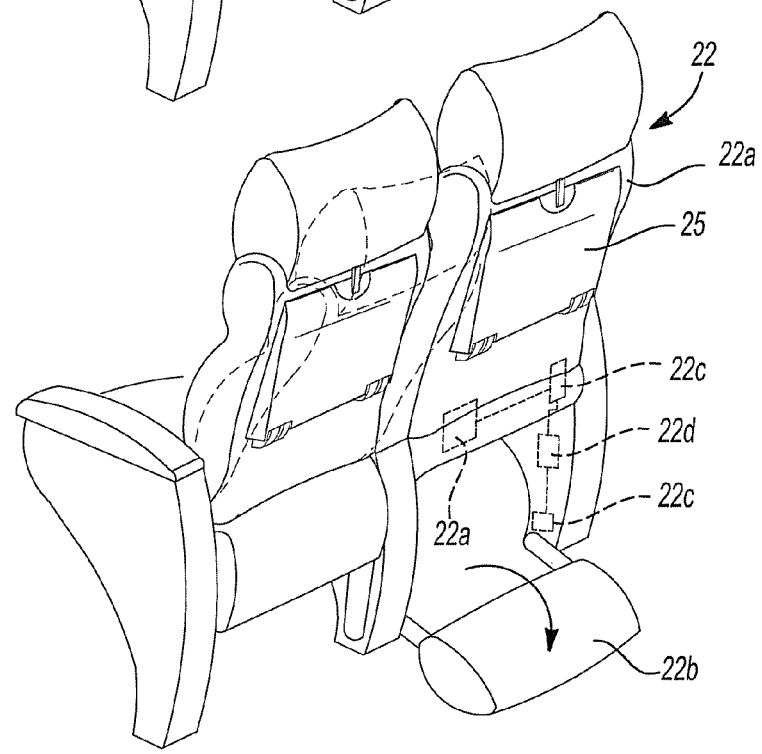
FIG. 3 is a schematic illustration of exemplary passenger seats onboard the mobile platform of FIG. 1 that are capable of reclining, an exemplary passenger footrest and an exemplary tray table.

As the passenger seat 22 could comprise any suitable seating surface known in the art, the passenger seat 22 will not be described in great detail herein. Briefly, however, with reference to FIGS. 2 and 3, the passenger seat 22 includes a seat back 22a, a footrest 22b, a motor 22d, a vibration device 22e, a vibration device 22f and a tray table 25. The seat back 22a may be pivotable into a reclined position and the footrest 22b may be pivoted into an extended position. Each of the seat back 22a and the footrest 22b may include a position sensor 22c, that is in communication with and responsive to the controller 18 through a wired or a wireless connection (not specifically shown) to indicate if the seat back 22a is in the reclined position and if the footrest 22b is in the extended position. The motor 22d may be coupled to the seat back 22a and the footrest 22b, and in communication with and responsive to the controller 18 through a wired or a wireless connection (not specifically shown) to move the seat back 22a into and out of the reclined position (shown in phantom) and to move the footrest 22b into and out of the extended position. The motor 22d may comprise any suitable motor, and thus, will not be discussed in detail herein.

The vibration device 22e may be coupled to the passenger seat 22 so as to be retained within the passenger seat 22. The vibration device 22e may be operable to output a vibration to the passenger seat 22 that may be felt by the passenger in the passenger seat 22. The vibration device 22e may be in wired or wireless communication with the controller 18 (not specifically shown). The controller 18 may activate the vibration device 22e to notify the passenger prior to the landing of the aircraft 8, if desired, or to notify the passenger of impending movement. In addition, a vibration device 22f may be coupled to and retained with the footrest 22b to apply a vibration to the footrest 22b. The vibration device 22f may be in communication with and responsive to the controller 18 to vibrate the footrest 22b such that the vibration may be felt by the passenger using the footrest 22b. It should be noted that the vibration device 22e and vibration device 22f may comprise one vibration device if desired. In addition, the vibration device 22e, 22f may also be activated to signal movement. For example, nearing landing of the aircraft 8, the vibration device 22e may vibrate gently before moving the seat back 22a into an upright position, to notify the passenger that the seat back 22a is about to move.

The tray table 25 may be coupled to the seat back 22a, and has a latch 25a and one or more dampers 25b. The latch 25a may comprise a programmable fastener that is in communication with and responsive to the controller 18 to unlatch and release the tray table 25 from the seat back 22a. The dampers 25b may enable the tray table 25 to move between the latched (closed position, as indicated by reference numeral 25c) and unlatched position (opened position, not shown), when the latch 25a is unlatched.

The passenger service unit 26 may be coupled to the cabin 16 such that the passenger service unit 26 is suspended over the passenger seat 22, as shown in FIG. 2. The passenger service unit 26 may be responsive to and in communication with the controller 18 (as illustrated in phantom). The passenger service unit 26 may include at least one light source or reading light 30, a light sensor 31, at least one attendant call button 32, a camera 34, a ventilation supply nozzle, a ventilation fan or gasper 35, and at least one physiological sensor 36. Each of the reading light 30, light sensor 31, attendant call button 32, camera 34, gasper 35 and physiological sensor 36 may be in communication with and responsive to the controller 18 through either a wired or wireless connection (exemplary connection 37 illustrated in phantom in FIGS. 1 and 2). The reading light 30, when activated by the controller 18, may illuminate the associated passenger seat 22 to provide a desirable reading environment. The light sensor 31 may send data indicative of the lighting conditions at the passenger seat 22. The attendant call button 32, when activated by the controller 18, transmits a signal to the control panel 28 in the crew area 20 that assistance is needed at the particular passenger seat 22. The camera 34 may comprise any suitable device capable of acquiring an image of the passenger in the passenger seat 22 and transmitting that acquired image to the controller 18. The gasper 35, when activated by the controller 18, may increase or decrease an air flow experienced by the passenger in the passenger seat 22. The gasper 35 includes a housing 35a rotatable between an opened position and a closed position by a motor 35b (may be functionally similar to the aperture setting on a camera) in communication with and responsive to the controller 18. Upon receipt of a signal from the controller 18, the motor 35b moves the housing 35a into a desired position to adjust the air flow from the gasper 35.

The at least one physiological sensor 36 may comprise any desirable physiological sensor, such as a body temperature sensor 36a. The body temperature sensor 36a may comprise an infrared sensor, such as an infrared camera, for example. If an infrared camera is used, the infrared camera may measure the amount of heat given off by the seat occupant, which may be compared to some known value for a passenger of the size of the seat occupant or to data stored in a profile associated with the passenger. The physiological sensor 36 may monitor one or more physiological characteristics, conditions or functions of the passenger in the passenger seat 22 if desired, such as in the case of a critical care passenger. The physiological sensor 36 may be in communication with the controller 18 to enable the controller 18 to monitor the physiological functions of the passenger and notify a crew member on the aircraft 8 if the monitored physiological function drops below a pre-selected threshold. For example, if the controller 18 determines that the body temperature of the passenger has dropped below a threshold value, then the controller 18 may notify the crew member to provide the passenger with a blanket. The body temperature sensor 36a may also be used to interpolate the stress level of the at least one passenger, which could be noted as an increase in the body temperature of the at least one passenger. The controller 18 may comprise a computer and/or processor, and memory to hold instruction and data related to the smart cabin control module 10.

Figure 4:
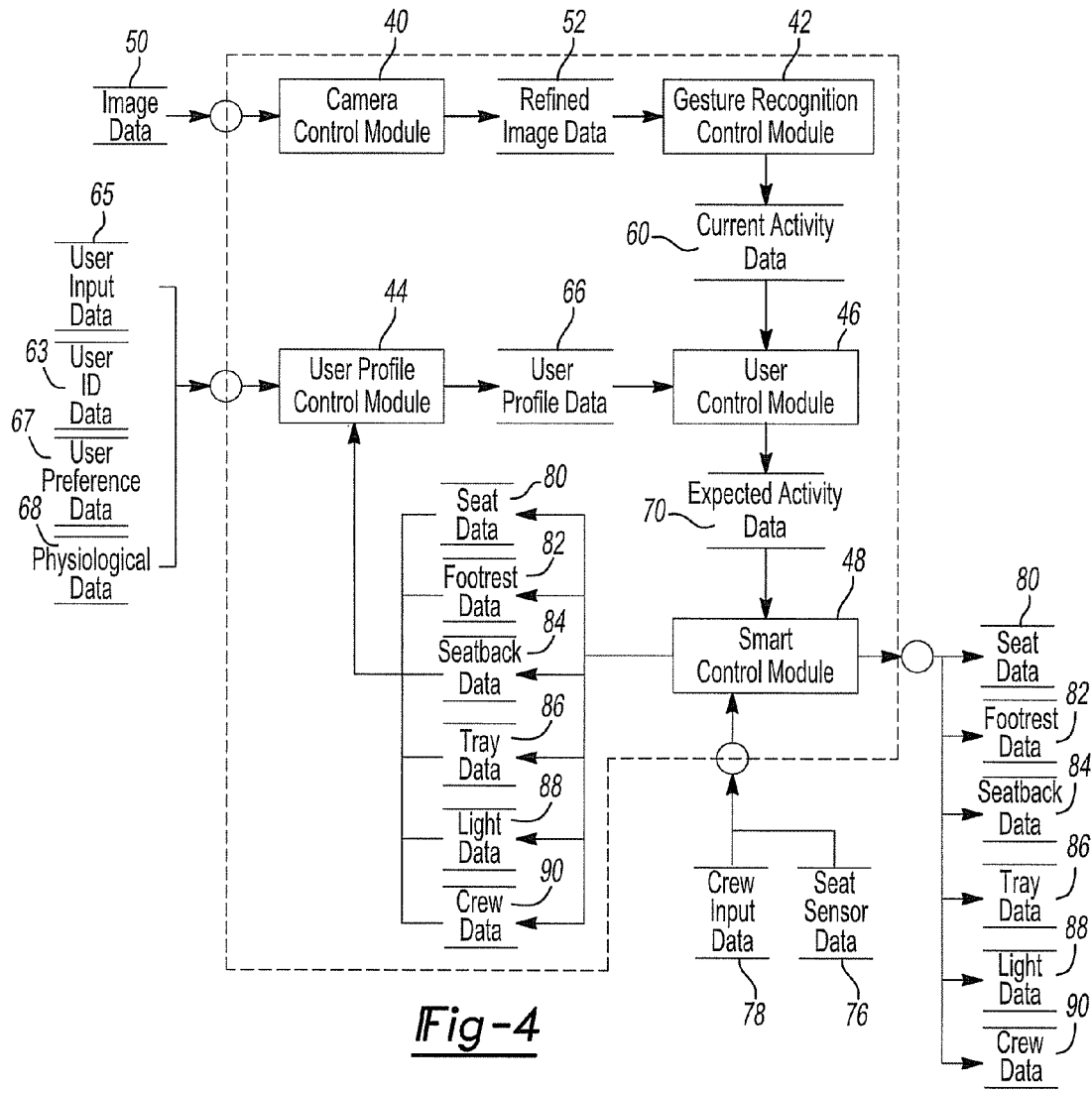
FIG. 4 is a dataflow diagram illustrating an exemplary smart cabin control system for use with the mobile platform of FIG. 1 according to the principles of the present disclosure.

In FIG. 4, a dataflow diagram illustrates various components of a smart cabin control system that is embedded within the smart cabin control module 10. Various embodiments of the smart cabin control module 10 may include any number of sub-modules embedded within the smart cabin control module 10. The sub-modules shown in FIG. 4 may be combined and/or further partitioned to similarly control the cabin 16 of the aircraft 8. Inputs to the smart cabin control module 10 are received from other control modules (not shown) within the aircraft 8, and/or determined by other sub-modules (not shown) within the smart cabin control module 10 (not shown). In FIG. 4, the smart cabin control module 10 includes a camera control module 40, a gesture recognition control module 42, a user control module 46, a user profile module 44, and a smart control module 48.

The camera control module 40 receives as input image data 50 from the camera 34. The image data 50 comprises an image of the passenger in the passenger seat 22. Based on the image data 50, the camera control module 40 sets refined image data 52 for the gesture recognition control module 52. The refined image data 42 may comprise a simplified version of the image acquired by the camera 34 formed by signal process that includes noise removal and compensation. Thus, the refined image data 42 comprises basic image data associated with at least one activity about to be performed by the passenger in the passenger seat 22, such as reading, eating or resting.

Figure 5:
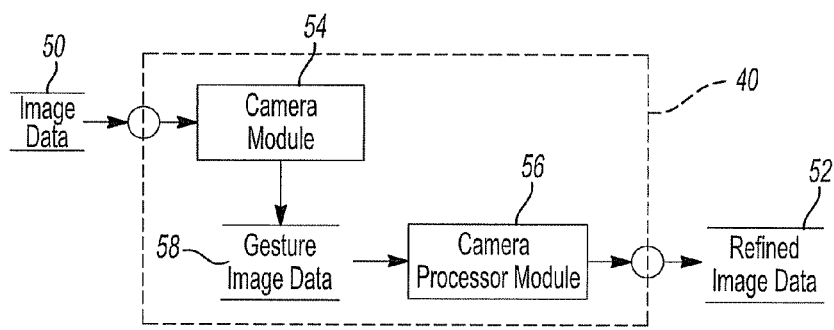
FIG. 5 is a dataflow diagram illustrating an exemplary camera control system of the present disclosure.

With reference to FIG. 5, a dataflow diagram illustrates an exemplary camera control system that may be embedded within the camera control module 40. The camera control module 40 includes a camera module 54 and a camera processor module 56. The camera module 54 receives as input the image data 50 from the camera 34. If the image data 50 comprises a movement or gesture, then the camera module 54 sets gesture image data 58 for the camera processor module 56.

The camera processor module 56 receives the gesture image data 58 as input. Given the gesture image data 58, the camera processor module 56 may remove noise and extraneous pixels to simplify the gesture captured in the gesture image data 58. The camera processor module 56 then outputs the refined gesture image data 58 as refined image data 52.

With reference back to FIG. 4, the gesture recognition control module 42 receives as input the refined image data 52. Based on the refined image data 52, the gesture recognition control module 42 sets current activity data 60 for the user control module 46. The current activity data 60 comprises data indicative of an activity presently being performed by the passenger as determined from the image data 50.

Figure 6:
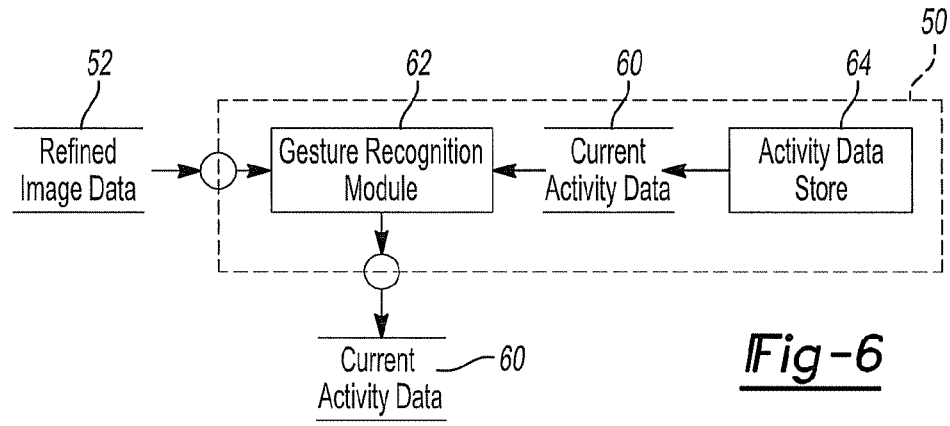
FIG. 6 is a dataflow diagram illustrating an exemplary gesture recognition control system of the present disclosure.

With reference to FIG. 6, a dataflow diagram illustrates an exemplary gesture control system that may be embedded within the gesture recognition control module 42. The gesture recognition control module 42 includes a gesture recognition module 62 and an activity data store 64. The gesture recognition module 62 receives as input the refined image data 52. Based on the refined image data 52, the gesture recognition module 62 determines if the image acquired in the refined image data 52 comprises a gesture. The gesture recognition module 62 may determine if the refined image data 52 comprises a gesture through any suitable technique, such as by comparing the refined image data 52 to a recognized gestures in a data store, or by using suitable gesture recognition software, such as GESTURETEK™ commercially available from GestureTek, Incorporated of Sunnyvale, Calif. Thus, based on the refined image data 52, the gesture recognition module 62 queries the activity data store 64 for current activity data 60 that corresponds to the gesture in the refined image data 52. The activity data store 64 may comprise one or more data storage devices and may be at least one of random access memory (RAM), read only memory (ROM), a cache, a stack, or the like which may temporarily or permanently store electronic data. The activity data store 64 stores electronic data associated with actions or activities that the passenger may complete. These activities may comprise reading, eating, or resting, for example. Based on the refined image data 52, the gesture recognition module 62 outputs the current activity data 60 for the user control module 46.

With reference to FIG. 4, the user profile control module 44 receives as input user input data 65, user identification (ID) data 63, user preference data 67 and physiological data 68. The user profile control module 44 may also receive as input seat data 80, footrest data 82, seat back data 84, tray data 86, light data 88 and crew data 90, as will each be discussed with regard to the smart control module 48. Each of the seat data 80, footrest data 82, seat back data 84, tray data 86, light data 88 and crew data 90 enable the user profile control module 44 to "learn" the preferences of the user seated in the associated passenger seat 22. The user input data 65 may comprise data received through at least one user input device (not shown), or could comprise an input received by the passenger interacting with one or more elements of the smart cabin control module 10, for example, the passenger applying a force against the tray table 25 as acquired through the image data 50. The user ID data 63 comprises at least a name of the passenger and the passenger seat 22 assigned to the passenger. The user ID data 63 may be received by a passenger list provided by an airline, an input to a user input device (such as a graphical user interface (GUI), not specifically shown), a radio frequency identification (RFID) tag coupled to the passenger, etc. The user preference data 67 comprises data that defines the passenger's preferences for the operation of the smart cabin control module 10, and may include desired anticipatory actions, movement limits (i.e. the seatback 22a may only recline so far), or if the passenger does not want the cabin 16 to anticipate his/her needs. The physiological data 68 comprises data received from the physiological sensor 36a. Based on the user input data 65, user ID data 63, user preference data 67, physiological data 68, the seat data 80, footrest data 82, seat back data 84, tray data 86, light data 88 and crew data 90, the user profile control module 44 sets user profile data 66 for the user profile control module 44. The user profile data 66 comprises at least a history of chronological passenger actions. For example, the user profile data 66 may comprise data such as after the passenger is done eating, the passenger generally reclines the seat back 22a, and extends the footrest 22b.

Figure 7:
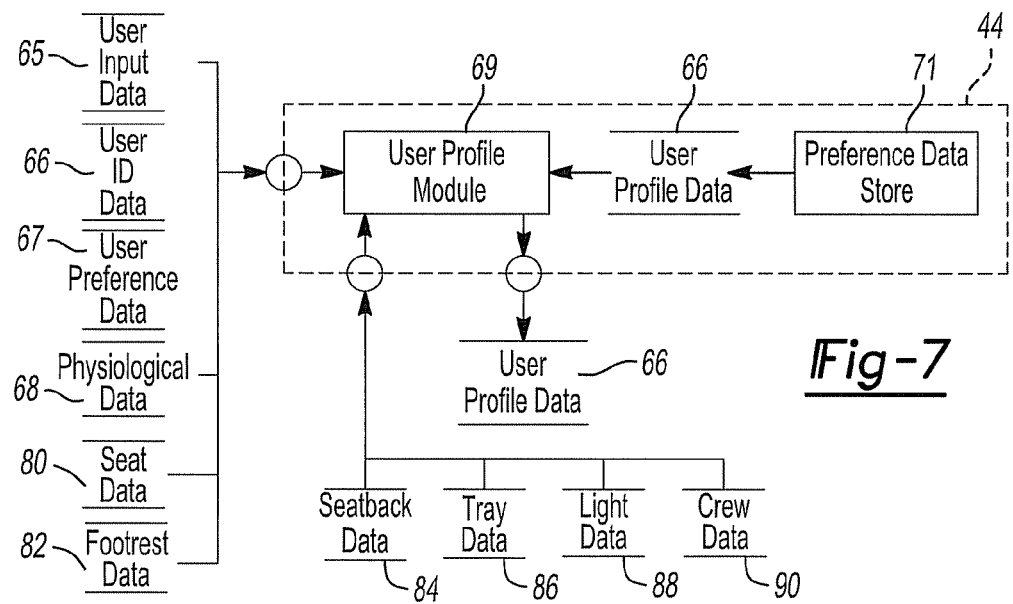
FIG. 7 is a dataflow diagram illustrating an exemplary user profile control system of the present disclosure.

With reference to FIG. 7, a dataflow diagram illustrates an exemplary user profile control system that may be embedded within the user profile control module 44. The user profile control module 44 includes a user profile module 69 and a preference data store 71. The user profile module 69 receives the user input data 65, user ID data 63, user preference data 67 and physiological data 68 as input. The user profile control module 44 may also receive as input seat data 80, footrest data 82, seat back data 84, tray data 86, light data 88 and crew data 90, as will each be discussed with regard to the smart control module 48. Based on the user input data 65, user ID data 63, user preference data 67, physiological data 68, the seat data 80, footrest data 82, seat back data 84, tray data 86, light data 88 and crew data 90, the user profile module 69 queries the preference data store 71 for user preference data 67 that corresponds with the passenger identified in the user ID data 63.

The preference data store 71 may comprise one or more data storage devices and may be at least one of random access memory (RAM), read only memory (ROM), a cache, a stack, or the like which may temporarily or permanently store electronic data. The preference data store 71 stores electronic data associated with the passenger's preferences for the smart cabin control module 10, such as which systems the passenger would like to have anticipate the passenger's needs, which activities the passenger generally performs in sequence, etc. In addition, the preference data store 71 may store the user input data 65, user preference data 67, the physiological data 68, the seat data 80, footrest data 82, seat back data 84, tray data 86, light data 88 and crew data 90 for the passenger identified in the user ID data 63 to enable the smart cabin control module 10 to "learn" the habits of the passenger, such that the smart cabin control module 10 may better anticipate the needs of the passenger as the passenger continues to use the smart cabin control module 10. The preference data store 71 may also store a default or standard user profile for use in cases when the passenger has not previously used the smart cabin control module 10. In addition, if desired, the passenger may load user profile data 66 from a portable storage device (not specifically shown). Based on the user input data 65, user ID data 63, user preference data 67, physiological data 68, the seat data 80, footrest data 82, seat back data 84, tray data 86, light data 88 and crew data 90, the user control module 46 outputs the user profile data 66 for the user control module 46.

With reference back to FIG. 4, the user control module 46 receives the current activity data 60, and user profile data 66 as input. The user profile data 66 comprises one or more preferences associated with the user that are received from the user profile control module 44. Based on the current activity data 60, user profile data 66 and user input data 65, the user control module 46 sets expected activity data 70. The expected activity data 70 comprises a next activity that the smart cabin control module 10 expects the passenger to perform.

Figure 8:
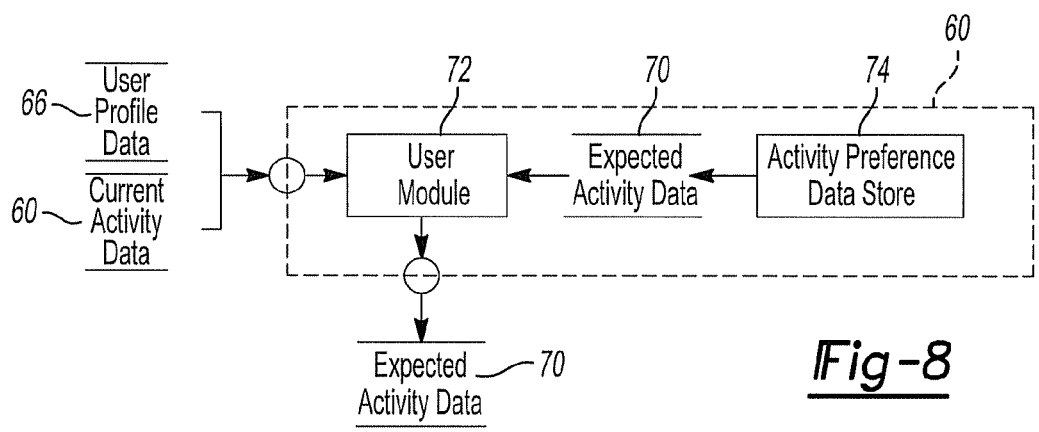
FIG. 8 is a dataflow diagram illustrating an exemplary user control system of the present disclosure.

With reference to FIG. 8, a dataflow diagram illustrates an exemplary user profile system that may be embedded within the user control module 46. The user control module 46 includes a user module 72 and an activity preference data store 74. The user module 72 receives the current activity data 60 and user profile data 66 as input. Based on the current activity data 60 and user profile data 66, the user module 72 queries the activity preference data store 74 for expected activity data 70 that corresponds with the current activity data 60 and user profile data 66. The activity preference data store 74 may comprise one or more data storage devices and may be at least one of random access memory (RAM), read only memory (ROM), a cache, a stack, or the like which may temporarily or permanently store electronic data. The activity preference data store 74 stores electronic data associated with the passenger's expected activities after the performance of a current activity. Thus, the activity preference data store 74 may comprise anticipatory activity data associated with the passenger based on the passenger's user profile data 66, which includes preferences for the operation of the smart cabin control module 10 given the recognized activity that the passenger is about to begin (for example, the passenger may not want the cabin 16 to anticipate his/her needs). Based on the current activity data 60 and user profile data 66, the user control module 46 outputs the expected activity data 70 for the smart control module 48.

With reference to FIG. 4, the smart control module 48 receives as input the expected activity data 70, seat sensor data 76 and crew input data 78. The seat sensor data 76 comprises data received from the position sensor 22c associated with the passenger seat 22. The crew input data 78 comprises data received from crew members via the control panel 28. For example, the crew input data 78 comprises a signal that the aircraft 8 is nearing the end of travel, or beginning to descent into an arrival airport. Based on the expected activity data 70, seat sensor data 76 and crew input data 78, the smart control module 48 outputs seat data 80, footrest data 82, seat back data 84, tray data 86, light data 88 and crew data 90. The seat data 80 comprises a signal to activate the vibration device 22e in the passenger seat 22 based on the crew input data 78. For example, if the crew input data 78 comprises a notification that the aircraft is preparing to land, then the smart control module 48 outputs the seat data 80 to activate the vibration device 22e to notify the passenger that the aircraft 8 is preparing to land, and to notify the passenger of impending movement. The footrest data 82 comprises data to activate the motor 22d to lower the footrest 22b, and may also comprise a signal to activate the vibration device 22f to vibrate the footrest 22b. The seat back data 84 comprises data to recline the seat back 22a into a desired position based on the current seat position provided by the seat sensor data 76 and the expected activity data 70. The tray data 86 comprises data to unlatch the latch 25a of the tray table 25 to lower the tray table 25 in response to the expected activity data 70. The light data 88 comprises data to activate or deactivate the reading light 30 based on the expected activity data 70. The crew data 90 comprises data to notify the crew member that the passenger in the passenger seat 22 requires assistance.

Figure 9:
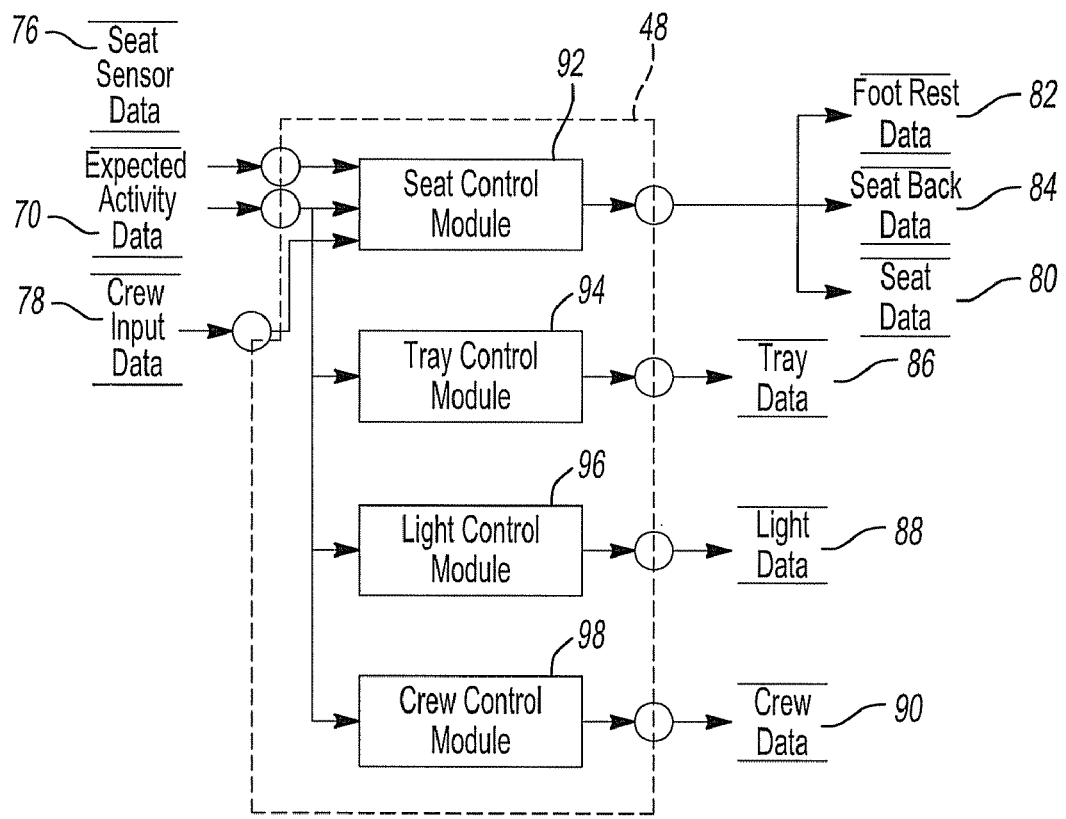
FIG. 9 is a dataflow diagram illustrating an exemplary smart control system of the present disclosure.

With reference to FIG. 9, a dataflow diagram illustrates an exemplary smart control system that may be embedded within the smart control module 48. The smart control module 48 includes a seat control module 92, a tray control module 94, a light control module 96 and a crew control module 98.

The seat control module 92 receives as input the seat sensor data 76, the expected activity data 70 and the crew input data 78. Based on the seat sensor data 76, the expected activity data 70 and the crew input data 78, the seat control module 92 outputs the seat data 80, footrest data 82 and seat back data 84. The seat data 80 may comprise a signal to activate the vibration device 22e in the passenger seat 22. The footrest data 82 comprises a signal to lower the footrest 22b based on the expected activity data 70. The seat back data 84 comprises a signal to recline or pivot the seat back 22a into a reclined position based on the expected activity data 70.

The tray control module 94 receives as input the expected activity data 70. Based on the expected activity data 70, the tray control module 94 outputs the tray data 86. The tray data 86 may comprise a signal to release the latch 25a of the tray table 25 to enable the tray table 25 to be released and lowered from the seat back 22a of the passenger seat 22.

The light control module 96 receives as input the expected activity data 70. Based on the expected activity data 70, the light control module 96 outputs light data 88. The light data 88 may comprise a signal to activate or deactivate the reading light 30.

The crew control module 98 receives as input the expected activity data 70. Based on the expected activity data 70, the crew control module 98 outputs the crew data 90. The crew data 90 comprises a signal to notify a crew member, via the control panel 28 in the crew area 20, that the passenger in the passenger seat 22 requires the attention of the crew. For example, the crew data 90 could comprise a notification that the passenger in the passenger seat 22 is cold and needs a blanket.

Figure 10:
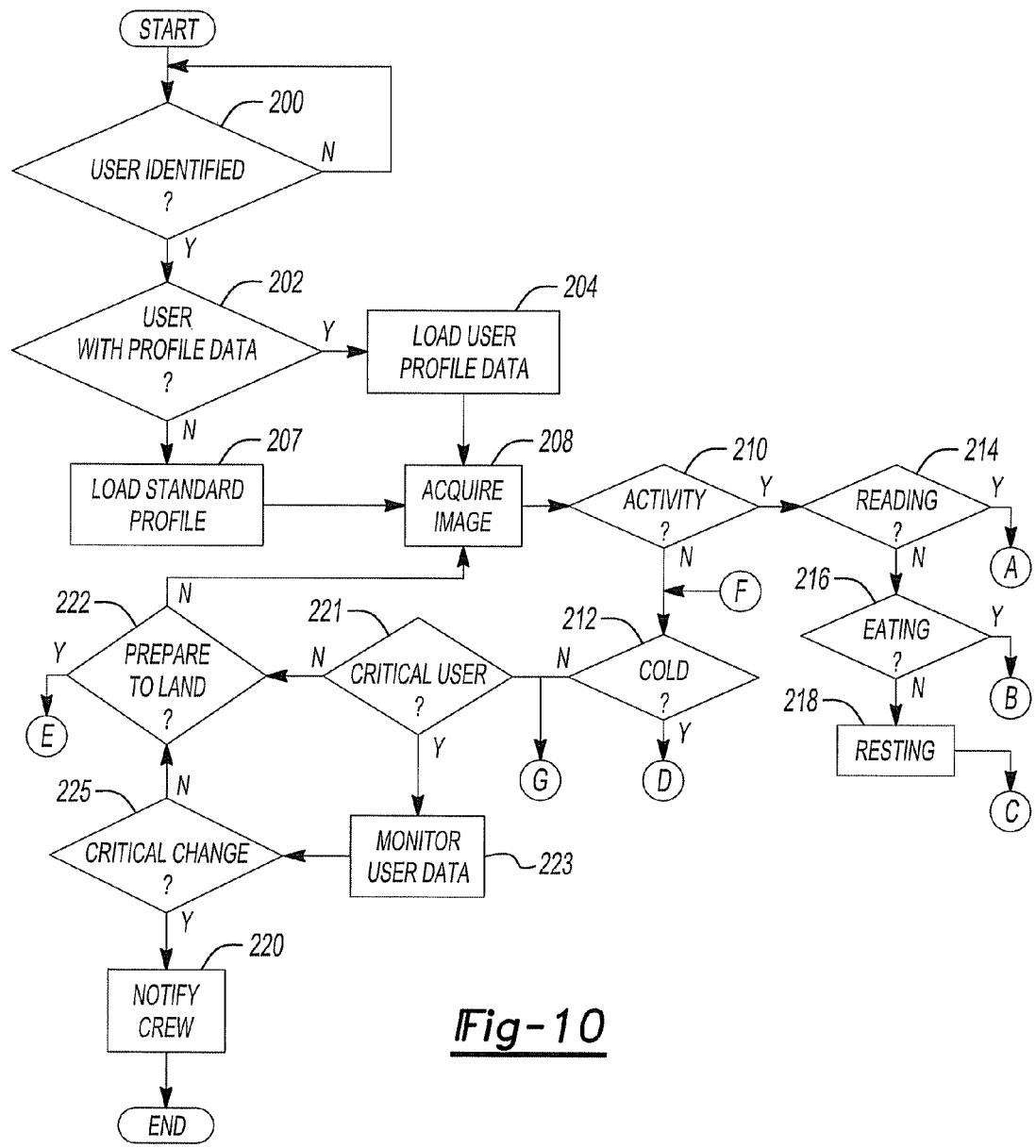
FIG. 10 is a flowchart illustrating an operational sequence for the smart cabin control system of FIG. 4.

With reference to FIG. 10, a process flow diagram illustrates an exemplary operational sequence performed by a smart cabin control system. At operation 200, the method determines if a user or a passenger has been identified. The passenger may be identified based on the receipt of the user ID data 66. If the passenger is not identified, then the method loops until the passenger is identified. At operation 202, the method determines if the passenger has user profile data 66 based on the user ID data 63 (FIG. 4). If the passenger does not have user profile data 66, then the method goes to operation 207, in which the method loads a standard user profile from the preference data store 71. If the passenger does have user profile data 66, then the method at operation 204 loads the user profile data 66. At operation 208, the method acquires the image of the passenger in the passenger seat 22 via the camera 34.

At operation 210, the method determines if the passenger is currently performing an activity, based on the image data 50 (FIG. 4). If the passenger is currently performing an activity, then the method goes to operation 214. Otherwise, the method goes to operation 212.

At operation 214, the method determines if the passenger is about to begin reading, eating, or resting by comparing the refined image data 50 with the electronic data in the activity data store 64. If the passenger is determined to be currently reading, then the method goes to "A" on FIG. 11. Otherwise, the method goes to operation 216.

Figure 11:
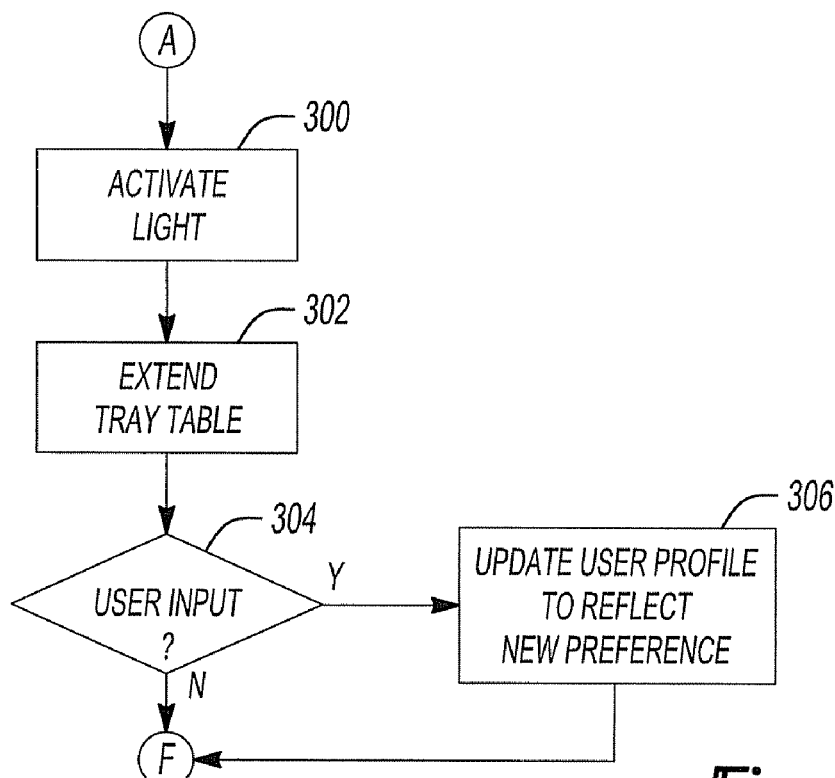
FIG. 11 is a flowchart illustrating an operational sequence for the smart cabin control system of FIG. 4.

With reference to FIG. 11, if the passenger is currently reading, then at operation 300, based on the current activity data 60, the method activates the reading light 30 with the light data 88 to create an optimal lighting environment for the passenger. The light data 88 comprises the desired lighting based on the user profile data 66. At operation 302, the method outputs the tray data 86 to unlatch the latch 25a. The release or unlatching of the latch 25a causes the tray table 86 to lower or pivot with respect to the seat back 22a. Then, at operation 304, the method determines if user input data 65 has been received, such as the passenger re-latching the latch 25a. If user input has not been received, then the method goes to "F" on FIG. 10. If user input data 65 has been received, then the method updates the user profile data 66 associated with the user in the preference data store 71 at operation 306 to reflect that the passenger does not want the tray table 25 lowered when the passenger is reading. The method then goes to "F" on FIG. 10.

If at operation 214, the passenger is not reading, then the method goes to operation 216. At operation 216, the method determines if the passenger is eating, based on the image data 50. If the passenger is eating, then the method goes to "B" on FIG. 12. Otherwise, the method goes to operation 216.

Figure 12:
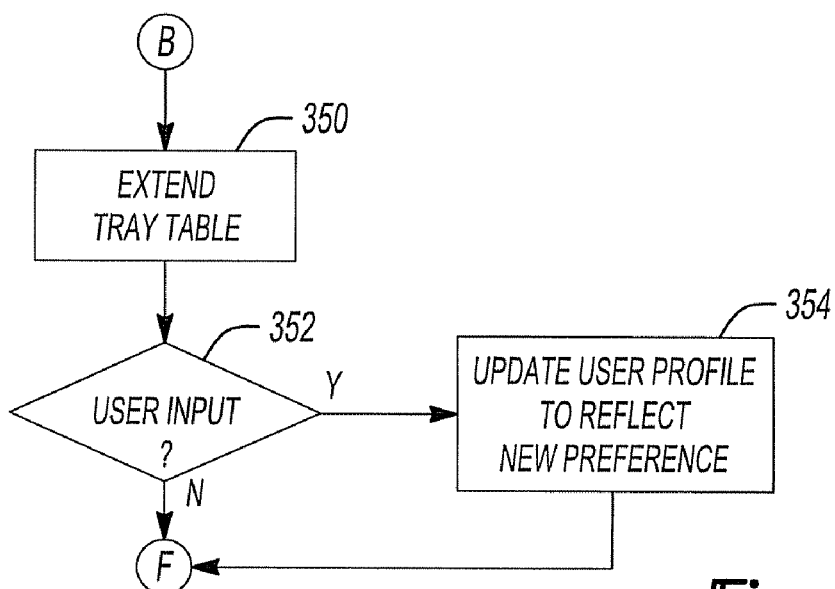
FIG. 12 is a flowchart illustrating an operational sequence for the smart cabin control system of FIG. 4.

With reference to FIG. 12, at operation 350, the method sets tray data 86 to unlatch the latch 25a and lower the tray table 25. Then, at operation 352, the method determines if user input data 65 has been received, such as the passenger re-latching the latch 25a. If user input has not been received, then the method goes to "F" on FIG. 10. If user input data 65 has been received, then the method updates the user profile data 66 associated with the user in the preference data store 71 at operation 354 to reflect that the passenger does not want the tray table 25 lowered when the passenger is eating. The method then goes to "F" on FIG. 10.

If at operation 216, the passenger is not eating, then the method goes to operation 218. At operation 218, the method determines that the passenger is resting, based on the image data 50, and goes to "C" on FIG. 13. With reference to FIG. 13, with the passenger resting, at operation 360, the method outputs the light data 88 to deactivate the reading light 30. Then, at operation 362, the method activates the motor 22d to recline the seat back 22a, and then at operation 364 the method activates the motor 22d to extend the footrest 22b. The method then goes to "F" on FIG. 10.

With reference to FIG. 10, if the passenger is not performing an activity or if the passenger has not moved to begin a new activity, then at operation 212 the method determines if the passenger's body temperature has changed based on the input received from the physiological sensor 36, such as the body temperature sensor 36a. If the body temperature has changed, then the method goes to "D" on FIG. 14. Otherwise, the method goes to operation 221.

With reference to FIG. 14, at operation 370 the method outputs crew data 90 to notify the crew via the control panel 28 that a blanket is needed for the passenger in the passenger seat 22. Then, at operation 372, the method determines if the passenger's body temperature has increased based on the signal received from the physiological sensor 36. If the passenger's body temperature has increased, then the method goes to "G" on FIG. 10. Otherwise, the method loops to operation 370.

With reference to FIG. 10, at operation 221, the method determines if the passenger is a critical passenger, such that the passenger that has a serious medical condition that requires monitoring by the crew of the aircraft 8. If the passenger is a critical passenger, then at operation 223, the method monitors the passenger's physiological function via the physiological sensor 36. Then, at operation 225, the method determines if there has been a critical change in the physiological function associated with the passenger. If there has been a critical change, then at operation 220, the method notifies the crew via the crew data 90 and then the method ends.

Otherwise, if there has been no critical change in the physiological function of the critical passenger, then the method goes to operation 222. Similarly, if the passenger is not a critical passenger, then the method goes to operation 222. In operation 222, the method determines if the aircraft 8 is preparing to land. If the aircraft 8 is preparing to land, then the method goes to "E" on FIG. 15. Otherwise, if the aircraft 8 is not preparing to land, the method loops to operation 208.

With reference to FIG. 15, at operation 400, the method determines if the passenger is awake. If the passenger is not awake or if the passenger is resting, then at operation 402 the method notifies the passenger that the aircraft 8 is preparing to land by activating the vibration device 22e in the passenger seat 22 to indicate impending movement. Then, at operation 404, the method also vibrates the footrest 22b by activating the vibration device 22f. At operation 406, the method outputs the footrest data 82 to retract the footrest 22b if the position sensor 22c indicates that the footrest 22b is extended, and then at operation 408, the method outputs the seat back data 84 raise the seat back 22a, if based on the seat sensor data 76, the seat back 22a is reclined. Then the method ends.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for anticipating the needs of at least one passenger onboard a mobile platform comprising:

a passenger seating area for receipt of the at least one passenger, the passenger seating area including a passenger seat that has a seat back that is moveable into a reclined position, a tray table that is operable to be positioned to provide a surface for use by the at least one passenger, and a light source disposed for illumination of at least a portion of the passenger seating area;

a camera that acquires an image of the at least one passenger in the passenger seating area;

a gesture control module that generates activity data that includes at least one activity that the at least one passenger is performing as recognized in the image of the at least one passenger acquired by the camera; and a smart control module that moves the seat back, positions the tray table, and activates or deactivates the light source based on the activity data.

2. The system of claim 1, wherein the gesture control module generates current activity data based on the acquired image, and the system further comprises:

a source of user preference data and user identification data;

a user profile control module that generates user profile data based on the user identification data, the user profile data including at least a chronological history of activities performed by the user; and a user control module that generates expected activity data based on the current activity data and the user profile data, the expected activity data comprising at least one next activity that the passenger is to perform based on the user profile data.

3. The system of claim 2, wherein the smart control module automatically moves the seat back, positions the tray table, activates or deactivates the light source and performs combinations thereof based on the expected activity data.

4. The system of claim 1, wherein the passenger seating area further comprises:

at least one physiological sensor operable to measure a physiological function of the at least one passenger in the passenger seating area; and the smart control module automatically notifies a crew member of the mobile platform if the physiological function of the at least one passenger is outside a preselected range.

5. The system of claim 1, wherein the at least one physiological sensor comprises a body temperature sensor, and the smart control module automatically notifies a crew member that the at least one passenger is cold if the measured body temperature of the at least one passenger is below a normal body temperature.

6. The system of claim 3, wherein if the activity is reading, the smart control module automatically moves the seat back into the reclined position, extends the tray table and activates the light source.

7. The system of claim 3, wherein if the current activity data comprises eating, the smart control module automatically extends the tray table.

8. The system of claim 3, wherein the passenger seating area further comprises a footrest that is movable into an extended position, and if the current activity data comprises resting, the smart control module automatically moves the seat back into the reclined position, deactivates the light source and moves the footrest into the extended position.

9. The system of claim 8, wherein if the mobile platform is nearing the end of a route of travel, the smart control module automatically raises the seat back from the reclined position.

10. The system of claim 9, wherein the passenger seat further comprises a seat cushion that includes a vibration device, and if the mobile platform is nearing the end of a route of travel and the at least one passenger is resting, the smart control module automatically activates the vibration device to notify the passenger that the mobile platform is nearing the end of travel.

11. A method of anticipating the needs of at least one passenger onboard a mobile platform comprising:
providing a passenger seating area for receipt of the at least one passenger, the passenger seating area including a passenger seat that has a light source disposed for illumination of at least a portion of the passenger seating area;
acquiring an image of the at least one passenger in the passenger seating area;
automatically determining from the acquired image if the at least one passenger is at least reading or resting;
automatically activating the light source if the passenger is reading; and
automatically de-activating the light source if the passenger is resting.

12. The method of claim 11, further comprising:
providing the passenger seat with a seat back that is moveable into a reclined position, and a tray table that is positionable to provide a surface for use by the at least one passenger;
automatically positioning the tray table if the passenger is reading; and
automatically reclining the seat back if the passenger is resting.

13. The method of claim 12, wherein determining from the acquired image further comprises:
automatically determining from the acquired image if the at least one passenger is eating; and
automatically positioning the tray table if the passenger is about to eat.

14. The method of claim 11, further comprising:
automatically moving the seat back from the reclined position if the mobile platform is nearing an end of travel.

15. The method of claim 14, further comprising:
providing a vibration device coupled to at least one of the passenger seat and a footrest adjacent to the passenger seat; and
automatically notifying the at least one passenger by activating the vibration device if the mobile platform is nearing the end of travel.

16. An aircraft comprising:
a fuselage that includes at least one passenger seating area for receipt of at least one passenger, with the at least one passenger seating area including a seat back that is movable into a reclined position, with the movement of the seat back controlled by a smart cabin control system including:
a camera that acquires an image of the at least one passenger in the passenger seating area; and
a smart cabin control module that automatically moves the seat back into the reclined position if, based on the acquired image, the at least one passenger is resting.

17. The aircraft of claim 16, wherein the passenger seating area further comprises a tray table that is extendable to provide a surface for use by the at least one passenger and a light source disposed over the passenger seating area.

18. The aircraft of claim 17, wherein if the at least one passenger is about to rest, the smart cabin control module automatically deactivates the light source.

19. The aircraft of claim 17, wherein if, based on the acquired image, the at least one passenger is reading, the smart cabin control module automatically moves the seat back into the reclined position, lowers the tray table and activates the light source.

20. The system of claim 17, wherein if, based on the acquired image, the at least one passenger is eating, the smart cabin control module automatically lowers the tray table.

21. A system for anticipating the needs of at least one passenger onboard an aircraft that includes a passenger seating area for receipt of the at least one passenger comprising:
a source of user preference data and user identification data;
a passenger seat that has a seat back that is moveable into a reclined position;
a tray table that is operable to be positioned to provide a surface for use by the at least one passenger;
a light source disposed for illumination of at least a portion of the passenger seating area;
a camera that acquires an image of the at least one passenger in the passenger seating area;
a gesture control module that generates current activity data that includes at least one current activity that the at least one passenger is performing as recognized in the image of the at least one passenger acquired by the camera; and
a user profile control module that generates user profile data based on the user identification data, the user profile data including at least a chronological history of activities performed by the user;
a user control module that generates expected activity data based on the current activity data and the user profile data, the expected activity data comprising at least one next activity that the system expects the passenger to perform based on the user profile data, chronological history and the current activity data; and
a smart control module that automatically moves the seat back, positions the tray table, and activates or deactivates the light source based on the expected activity data.

22. A method of anticipating the needs of at least one passenger onboard an aircraft comprising:
  providing a passenger seating area for receipt of the at least one passenger, the passenger seating area including a passenger seat that has a light source disposed for illumination of at least a portion of the passenger seating area, a seat back that is moveable into a reclined position, a footrest adjacent to the passenger seating area and a tray table that is positionable to provide a surface for use by the at least one passenger;
  providing a vibration device coupled to at least one of the passenger seat and a footrest adjacent to the passenger seat;
  receiving a user input regarding a status of the aircraft;
  acquiring an image of the at least one passenger in the passenger seating area;
  automatically determining from the acquired image if the at least one passenger is at least resting; and
  automatically notifying the at least one passenger by activating the vibration device if the aircraft is nearing the end of travel based on the status of the aircraft provided in the user input.

* * * * *